Nov. 3, 1925. 1,560,115
H. SMITH
SPRING SUSPENSION
Filed July 17, 1923
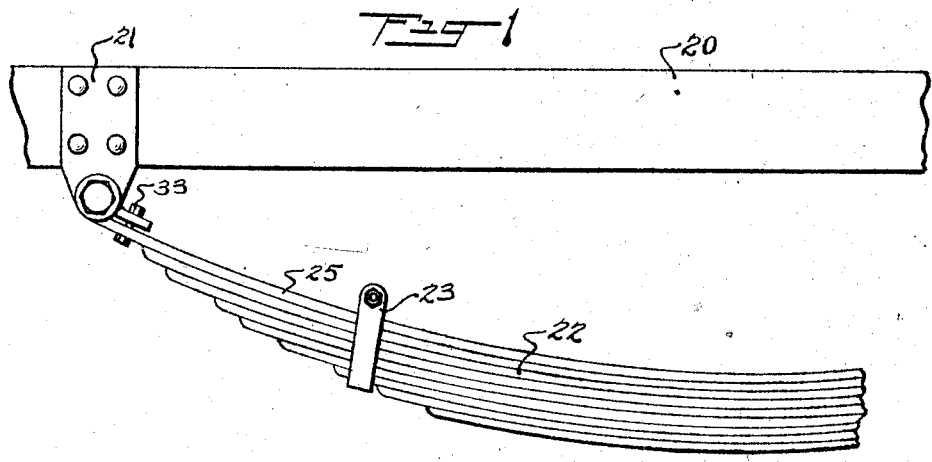
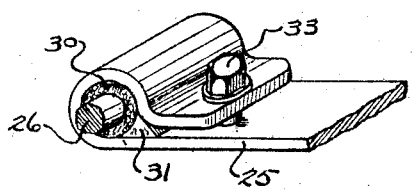
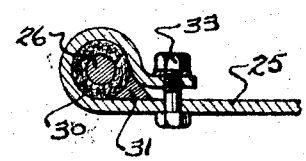
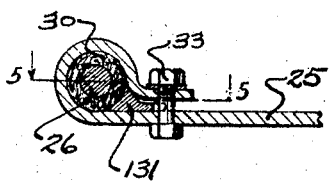
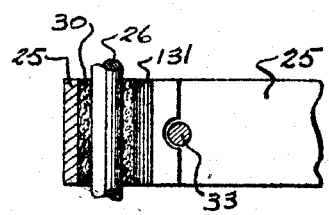
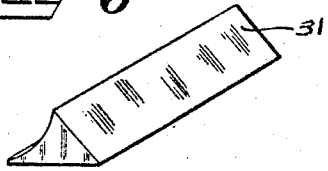
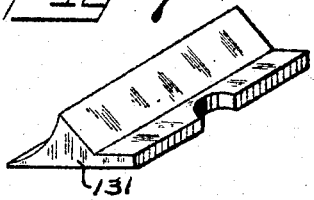
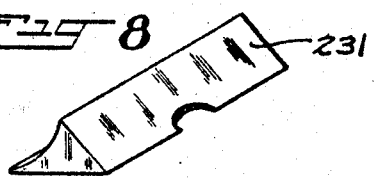
INVENTOR
Hinsdale Smith
BY
Albert H. Graves
ATTORNEY Patented Nov. 3, 1925.

1,560,115

UNITED STATES PATENT OFFICE.

HINSDALE SMITH, OF SPRINGFIELD, MASSACHUSETTS.

SPRING SUSPENSION.

Application filed July 17, 1923. Serial No. 652,019.

*To all whom it may concern:*

Be it known that I, HINSDALE SMITH, a citizen of the United States, and resident of Springfield, in the county of Hampden and State of Massachusetts, have invented certain new and useful Improvements in Spring Suspensions, of which the following is a specification.

This invention relates to spring suspension shackle bolts of the general type employed on motor vehicles for attaching leaf springs to the vehicle body.

The invention has for its main object the provision of spring shackle bolts of the character described of simple and inexpensive construction.

Another object relates to the provision of a spring suspension having no need for lubricants such as oil or grease and requiring a minimum of attention. In accordance with this object a shackle bolt of solid construction is provided thus reducing costs and increasing strength.

Another object relates to the use of anti-friction bushing material held in place by a wedge-shaped member, both being held in place by the supported spring leaf.

Another object relates to the provision of a single locking means for clamping portions of the spring leaf together and for locking the wedge-shaped member in place.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings,

Figure 1 shows a side elevation of a portion of a vehicle body supported on a leaf spring and secured thereto by a spring suspension of the present invention;

Figure 2 shows an enlarged perspective and Figure 3 a section of one form of the invention;

Figure 4 is a side elevation of a modified form;

Figure 5 is a section on the line 5—5 of Figure 4;

Figures 6 and 7 are perspective views of the wedges of Figures 2 and 4, respectively; and Figure 8 is a perspective view of a modified form of wedge.

Like reference characters refer to like parts in the several figures.

Referring to the drawing there is shown a portion of a vehicle body 20 having downwardly extending metal plates, such as 21, riveted thereto. The body 20 is supported upon a leaf spring 22 attached to the vehicle axle (not shown) in any suitable manner. A spring clip 23 of conventional design may be provided for maintaining the leaves substantially together.

The upper leaf 25 of the group of spring leaves is bent around through nearly a complete arc and then in a reverse arc and into spaced parallel relation to the general plane of itself. The first named arc is concentric with a solid shackle bolt 26 extending through the eye of the leaf 25 thus formed and through the plates 21, 21. The bolt 26 is preferably castellated or otherwise constructed to be secured in position.

For cushioning the vibrations of the bolt 26 and the spring eye the shank of the bolt 26 is enclosed within a tube or sleeve 30 of anti-friction material, such as brake lining or the like. A wedge 31 of generally triangular section, of a length substantially equal to the width of the spring leaf 25, and having one surface chamfered to correspond to the shape of the sleeve 30, is provided as shown clearly in Figure 2. A detailed view of the wedge, which may be of any suitable metal or anti-friction alloy, is shown in Figure 2. A bolt 33 extending through oppositely disposed holes in the spaced parallel portions of the leaf 25, is provided, and by turning down the nut of this bolt the tension of the eye portion of the leaf may be varied. Thus considerable compression pressure may be applied to the sleeve 30, for effectively maintaining it as well as the wedge 31 in position.

The device may be assembled by placing the sleeve 30 and the wedge 31 in their predetermined position in the eye, placing the spring leaf in position opposite the plate 21 which is drilled for the reception of the shank of the bolt 26. The bolt 26 is then passed through and its castellated nut applied together with a fastening, such as a cotter pin (not shown). The bolt 33 is then applied as has been described.

Under some conditions there may be some chance for the wedge 31 to slip out and be lost. In the modified form shown in Figures 4 and 5 this is obviated. The wedge 131 is constructed as shown in Figure 7. The construction and assembly of this form will be understood from the foregoing description, as parts having like functions have the same tens and units digits. For example, the wedge 131 of the form shown in Figures 4, 5 and 7 has the same function, although of modified construction, as the wedge 31 of the foregoing description.

In the said modified form the bolt 33 engages a notch in the wedge 131 and thus locks the wedge against appreciable movement. The same member clamps portions of the spring leaf 25 together. Thus the bolt 33 serves a double purpose.

The modified form of wedge 231 shown in Figure 8 is similar to the wedge 131 but the flange of the wedge 131 is eliminated. The wedge 231 is particularly well adapted for certain types of motor vehicles.

While I have shown and described and have pointed out in the annexed claims certain novel features of my invention, it will be understood that various omissions, substitutions and changes in the form and details of the device illustrated and in its operation may be made by those skilled in the art without departing from the spirit of my invention.

Having thus described my invention, I claim:

1. The combination of a shackle bolt, and a sleeve of anti-friction fabric surrounding the shank of the bolt, with a spring leaf bent through nearly a complete arc around said sleeve and then into spaced parallel relationship to the general plane of itself, and a wedge member in contact with only substantially that portion of the bushing which is coextensive with the remaining portion of the arc, and actuated by movement of said spring leaf.

2. The combination of a shackle bolt, and a sleeve of anti-friction fabric surrounding the shank of the bolt, with a spring leaf bent through nearly a complete arc around said sleeve and then into spaced parallel relationship to the general plane of itself, a wedge member in contact with only substantially that portion of the bushing which is coextensive with the remaining portion of the arc and actuated by relative movement of portions of said spring leaf, and a bolt for varying the tension of the eye portion of the spring leaf.

3. The combination of a shackle bolt, and a sleeve of anti-friction fabric surrounding the shank of the bolt with a spring leaf bent through nearly a complete arc around said sleeve and then into spaced parallel relationship to the general plane of itself, a wedge member in contact with only substantially that portion of the bushing which is coextensive with the remaining portion of the arc, and actuated by relative movement of portions of said spring leaf, and a bolt for applying compression pressure to said sleeve.

4. The combination of a shackle bolt, and a sleeve of anti-friction fabric surrounding the shank of the bolt, with a spring leaf bent through nearly a complete arc around said sleeve and then into spaced parallel relationship to the general plane of itself, a notched wedge member constructed to fill up the remaining portion of the arc, and a bolt for clamping the spaced parallel portions of the spring leaf together, and for engaging the notch of said wedge member to maintain the wedge in predetermined position.

5. The combination of an adjustable spring eye, a flexible anti-friction bushing surrounding a shackle bolt within said spring eye, and a wedge arranged to maintain said bushing in substantially circular shape, comprising a member of substantially triangular cross section, having a surface contacting with a limited portion of the peripheral surface of said bushing.

Signed at Springfield, in the county of Hampden and State of Massachusetts, this 10th day of July A. D. 1923.

HINSDALE SMITH.